US011380123B2

(12) United States Patent
Park

(10) Patent No.: US 11,380,123 B2
(45) Date of Patent: Jul. 5, 2022

(54) ELECTRONIC DEVICE FOR PREVENTING DISPLAY BURN-IN

(71) Applicant: Samsung Electronics Co., Ltd., Suwon-si (KR)

(72) Inventor: Juyeol Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/698,531

(22) Filed: Nov. 27, 2019

(65) Prior Publication Data

US 2020/0175246 A1    Jun. 4, 2020

(30) Foreign Application Priority Data

Nov. 30, 2018    (KR) .................. 10-2018-0151679

(51) Int. Cl.
*G09G 5/10*     (2006.01)
*G06V 40/13*    (2022.01)
(Continued)

(52) U.S. Cl.
CPC .......... *G06V 40/1318* (2022.01); *G06F 21/32* (2013.01); *G06Q 20/40145* (2013.01);
(Continued)

(58) Field of Classification Search
CPC ............. G09G 5/10; G09G 2320/0626; G09G 2354/00; G09G 2360/144; G09G 2330/021; G09G 5/02; G09G 3/20
See application file for complete search history.

(56) References Cited

U.S. PATENT DOCUMENTS 9,841,879 B1 * 12/2017 Gray ...................... G06F 3/0484
9,852,672 B2 * 12/2017 Kim ......................... G09G 3/20
(Continued)

FOREIGN PATENT DOCUMENTS

EP        3299947 A1    3/2018
KR    10-0716046 B1    5/2007
(Continued)

OTHER PUBLICATIONS

International Search Report dated Mar. 20, 2020 in connection with International Patent Application No. PCT/KR2019/016437, 12 pages.

*Primary Examiner* — Olga V Merkoulova

(57) ABSTRACT

An electronic device includes a housing including a cover glass and a back cover facing the cover glass, a display disposed inside the housing and including a plurality of pixels disposed in the display, a first printed circuit board interposed between the display and the back cover, a second printed circuit board interposed between the first printed circuit board and the back cover, a fingerprint sensor disposed on the first printed circuit board and configured to obtain fingerprint information of a user based on light reflected from a finger of the user making contact with the cover glass, and a processor disposed on the second printed circuit board and adjusting brightness of first-group pixels disposed at an area corresponding to the fingerprint sensor. The processor increases the brightness of the first-group pixels to be proportional to time in which the user makes contact with the cover glass with the finger.

10 Claims, 8 Drawing Sheets

(51) Int. Cl.
  *G06Q 20/40* (2012.01)
  *G06F 21/32* (2013.01)
  *G06V 10/98* (2022.01)
  *G06V 10/141* (2022.01)
(52) U.S. Cl.
  CPC ............ *G06V 10/141* (2022.01); *G06V 10/98* (2022.01); *G09G 5/10* (2013.01); *G09G 2320/046* (2013.01); *G09G 2320/0686* (2013.01); *G09G 2354/00* (2013.01)

(56) References Cited

U.S. PATENT DOCUMENTS

| | | | |
|---|---|---|---|
| 10,088,939 B2 | 10/2018 | Benkley, III et al. | |
| 10,101,851 B2 | 10/2018 | Benkley, III et al. | |
| 10,176,355 B2 | 1/2019 | Smith et al. | |
| 10,198,611 B2 | 2/2019 | Evans, V et al. | |
| 10,223,571 B2 | 3/2019 | Evans, V et al. | |
| 2004/0228508 A1* | 11/2004 | Shigeta | G06K 9/00026 382/124 |
| 2005/0213799 A1 | 9/2005 | Sawano | |
| 2012/0106808 A1* | 5/2012 | Morioka | G06K 9/0008 382/125 |
| 2012/0321149 A1* | 12/2012 | Carver | G06V 40/1394 382/124 |
| 2013/0112855 A1* | 5/2013 | McLeod | G01J 1/0418 250/208.2 |
| 2013/0119237 A1* | 5/2013 | Raguin | H01L 27/14601 250/208.1 |
| 2013/0120760 A1* | 5/2013 | Raguin | G01B 11/24 356/612 |
| 2015/0348460 A1* | 12/2015 | Cox | G06F 3/14 345/690 |
| 2015/0369661 A1* | 12/2015 | Lin | G06V 40/1318 250/227.11 |
| 2016/0132712 A1* | 5/2016 | Yang | G06V 40/1306 348/77 |
| 2017/0068447 A1* | 3/2017 | Hong | G06F 3/04883 |
| 2017/0161543 A1 | 6/2017 | Smith et al. | |
| 2017/0300736 A1* | 10/2017 | Song | G06K 9/0004 |
| 2017/0308228 A1 | 10/2017 | Benkley et al. | |
| 2017/0308731 A1* | 10/2017 | Evans, V | G06F 3/0412 |
| 2017/0364763 A1* | 12/2017 | Jin | G06F 3/0421 |
| 2018/0068160 A1* | 3/2018 | Wu | G06K 9/00201 |
| 2018/0096187 A1* | 4/2018 | Kwon | G06F 21/32 |
| 2018/0225503 A1* | 8/2018 | Kim | G06K 9/00053 |
| 2018/0285619 A1* | 10/2018 | Kim | G06K 9/00013 |
| 2019/0057660 A1* | 2/2019 | Lee | G06F 1/1684 |
| 2019/0065808 A1 | 2/2019 | Zhang et al. | |
| 2019/0102597 A1* | 4/2019 | Lu | G09G 5/10 |
| 2019/0156746 A1* | 5/2019 | Kim | G09G 3/3208 |
| 2020/0082145 A1 | 3/2020 | Wang et al. | |
| 2020/0285829 A1* | 9/2020 | Chang | G06K 9/00067 |
| 2020/0342202 A1* | 10/2020 | Bae | G06F 1/3265 |

FOREIGN PATENT DOCUMENTS

| | | |
|---|---|---|
| KR | 10-2017-0095737 A | 8/2017 |
| KR | 10-2017-0141522 A | 12/2017 |

* cited by examiner

ELECTRONIC DEVICE FOR PREVENTING DISPLAY BURN-IN

CROSS-REFERENCE TO RELATED APPLICATIONS

This application is based on and claims priority under 35 U.S.C. § 119 to Korean Patent Application No. 10-2018-0151679, filed on Nov. 30, 2018, in the Korean Intellectual Property Office, the disclosure of which is incorporated by reference herein its entirety

BACKGROUND

1. Field

The disclosure relates to a technology of preventing display burn-in.

2. Description of Related Art

As a technology of recognizing bio information is developed, an electronic device (e.g., a smart phone) equipped with a biometric sensor has been extensively spread. In other words, the electronic device may obtain the fingerprint information of a user through a fingerprint recognition sensor. The electronic device may unlock a locked screen or perform a financial payment by using the obtained fingerprint information.

The above information is presented as background information only to assist with an understanding of the disclosure. No determination has been made, and no assertion is made, as to whether any of the above might be applicable as prior art with regard to the disclosure.

SUMMARY

The fingerprint sensor may obtain the fingerprint information based on light output from the display. For example, the light output from the display is reflected from the fingerprint of a user making contact with a cover glass and input to the fingerprint sensor. The fingerprint sensor may obtain the fingerprint information based on light output from the display.

However, as the operation of obtaining the fingerprint information is repeated, a display burn-in phenomenon may occur. In particular, the burn-in phenomenon more severely occurs at an area, which corresponds to the fingerprint sensor, of the display rather than another area of the display.

Aspects of the disclosure are to address at least the above-mentioned problems and/or disadvantages and to provide at least the advantages described below. Accordingly, an aspect of the disclosure is to provide an electronic device.

In accordance with an aspect of the disclosure, an electronic device may include a housing including a cover glass and a back cover facing the cover glass, a display panel disposed inside the housing and including a plurality of pixels disposed in the display panel, a first printed circuit board interposed between the display panel and the back cover, a second printed circuit board interposed between the first printed circuit board and the back cover, a fingerprint sensor disposed on the first printed circuit board to obtain fingerprint information of a user based on light reflected from a finger of the user making contact with the cover glass, and a processor disposed on the second printed circuit board to adjust a brightness of first-group pixels disposed at an area corresponding to the fingerprint sensor. The processor may increase the brightness of the first-group pixels to be proportional to time in which the user makes contact with the cover glass with the finger, when the user makes contact with the cover glass with the finger.

In accordance with another aspect of the disclosure, an electronic device may include a housing including a cover glass and a back cover facing the cover glass, a display panel disposed inside the housing and including a plurality of pixels disposed in the display panel, a first printed circuit board interposed between the display panel and the back cover, a second printed circuit board interposed between the first printed circuit board and the back cover, a fingerprint sensor disposed on the first printed circuit board to obtain fingerprint information of a user based on light reflected from a finger of the user making contact with the cover glass, and a processor disposed on the second printed circuit board to adjust a brightness of first-group pixels disposed at an area corresponding to the fingerprint sensor. The processor may attempt to obtain the fingerprint information by emitting light of the first-group pixels with first brightness, when the user makes contact with the cover glass with the finger, and allow the first-group pixels to emit the light with a second brightness brighter than the first brightness, when the finger of the user is detached from the cover glass and then makes re-contact with the cover glass.

In accordance with another aspect of the disclosure, an electronic device may include a housing including a cover glass and a back cover facing the cover glass, a display panel disposed inside the housing and including a plurality of pixels disposed in the display panel, a first printed circuit board interposed between the display panel and the back cover, a second printed circuit board interposed between the first printed circuit board and the back cover, a fingerprint sensor disposed on the first printed circuit board to obtain fingerprint information of a user based on light reflected from a finger of the user making contact with the cover glass, and a processor disposed on the second printed circuit board to adjust a brightness of first-group pixels disposed at an area corresponding to the fingerprint sensor. The processor may calculate a failure count that the fingerprint information fails to be obtained even through the finger of the user makes contact with the cover glass, set the brightness of the first-group pixels to be proportional to the failure count, and emit light of the first-group pixels with the set brightness when the finger of the user makes contact with the cover glass.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
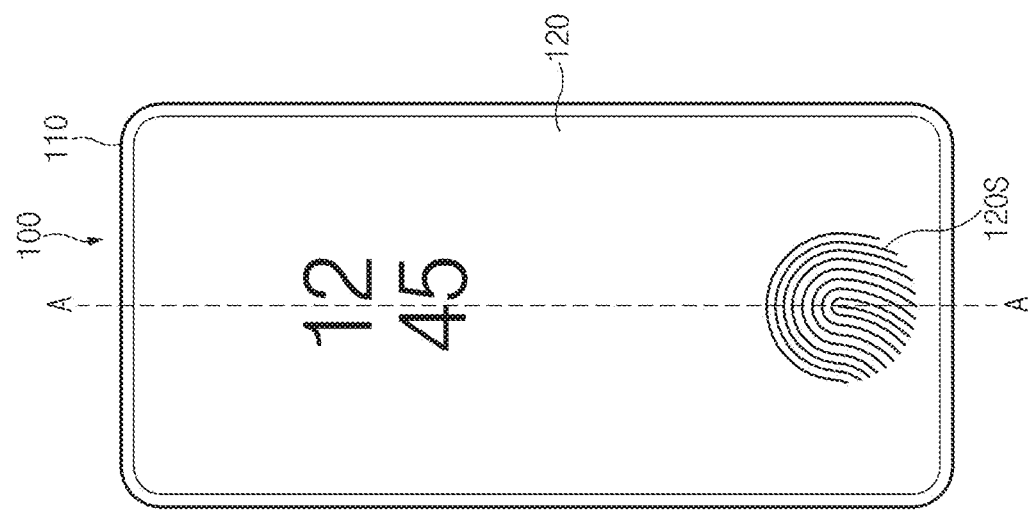
FIG. 1 illustrates an electronic device according to a comparative example and an electronic device according to an embodiment of the disclosure.
Figure 1:
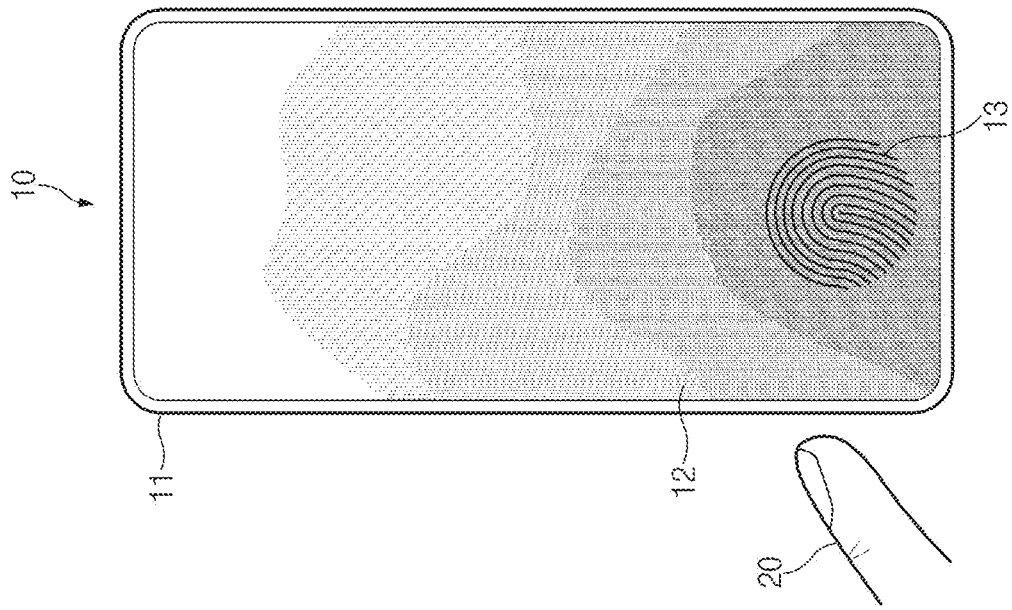

FIG. 1 illustrates an electronic device according to a comparative example and an electronic device according to an embodiment of the disclosure.

Referring to FIG. 1, an electronic device 10 according to a comparative example may include a housing 11 and a display 12.

The housing 11 may form an outer appearance of the electronic device 10.

The display 12 may output light by emitting the light. The electronic device 10 may obtain fingerprint information of a user based on the output light. For example, when the output light is reflected from a finger 20 of the user and returned, the electronic device 10 may obtain the fingerprint information based on the reflected light.

According to an embodiment of the disclosure, an electronic device 100 may include a housing 110 and a display 120.

The housing 110 may protect various parts included in the electronic device 100 from an external impact by forming the outer appearance of the electronic device 100.

The display 120 may adjust the brightness of an area (hereinafter, referred to as a "fingerprint sensing area 120s") corresponding to a fingerprint sensor. According to an embodiment, the display 120 may increase the brightness of the fingerprint sensing area 120s in proportion to a time in which the finger 20 of the user makes contact with the fingerprint sensing area 120s. For example, when the finger 20 of the user makes contact with the fingerprint sensing area 120s, the display 120 may control the fingerprint sensing area 120s to emit light with 300 Lux. If the fingerprint information is not obtained even if the fingerprint sensing area 120s emits the light with 300 Lux, the display 120 may gradually increase the brightness of the fingerprint sensing area 120s. The brightness of the fingerprint sensing area 120s may be gradually increased until the fingerprint information is obtained.

According to another embodiment, the display 120 may increase the brightness of the fingerprint sensing area 120s in proportion to a count in which a finger 20 of the user makes contact with the fingerprint sensing area 120s. For example, when the finger 20 of the user makes contact with the fingerprint sensing area 120s, the display 120 may control the fingerprint sensing area 120s to emit light with 300 Lux. If the fingerprint information is not obtained even if the fingerprint sensing area 120s emits the light with 300 Lux, the user detaches the finger 20 from the fingerprint sensing area 120s and makes contact with the fingerprint sensing area 120s with the finger 20 again, and the display 120 may control the fingerprint sensing area 120s to emit light with 400 Lux. Whenever the user detaches the finger 20 from the fingerprint sensing area 120s and makes contact with the fingerprint sensing area 120s again, the brightness of the fingerprint sensing area 120s may be gradually increased.

According to another embodiment, the electronic device 100 may calculate a failure count that the fingerprint information fails to be obtained even if the finger 20 of the user makes contact with the fingerprint sensing area 120s. The electronic device 100 may set the initial brightness of the fingerprint sensing area 120s based on the failure count. For example, when the fingerprint information of a first user fails to be obtained one time, the electronic device 100 may set the brightness of the fingerprint sensing area 120s to 300 Lux. For example, when the fingerprint information of a second user fails to be obtained two times, the electronic device 100 may set the brightness of the fingerprint sensing area 120s to 400 Lux. As the failure count is increased, the brightness of the fingerprint sensing area 120s may be gradually increased.

According to a comparative example, the electronic device 10 may emit light of a fingerprint sensing area 13 with the same brightness (or the maximum brightness) whenever the finger 20 of the user makes contact with the fingerprint sensing area 13 regardless of the time or the count that the finger 20 of the user makes contact with the fingerprint sensing area 13 or the failure count. Accordingly, a burn-in phenomenon may occur in the fingerprint sensing area 13 and an area adjacent to the fingerprint sensing area 13. However, according to an embodiment of the disclosure, the electronic device 100 may adjust the brightness of the fingerprint sensing area 120s based on the time or the count that the finger 20 of the user makes contact with the fingerprint sensing area 120s or the failure count. Accordingly, a burn-in phenomenon may be prevented from occurring in the fingerprint sensing area 120s and an area adjacent to the fingerprint sensing area 120s.

Figure 2:
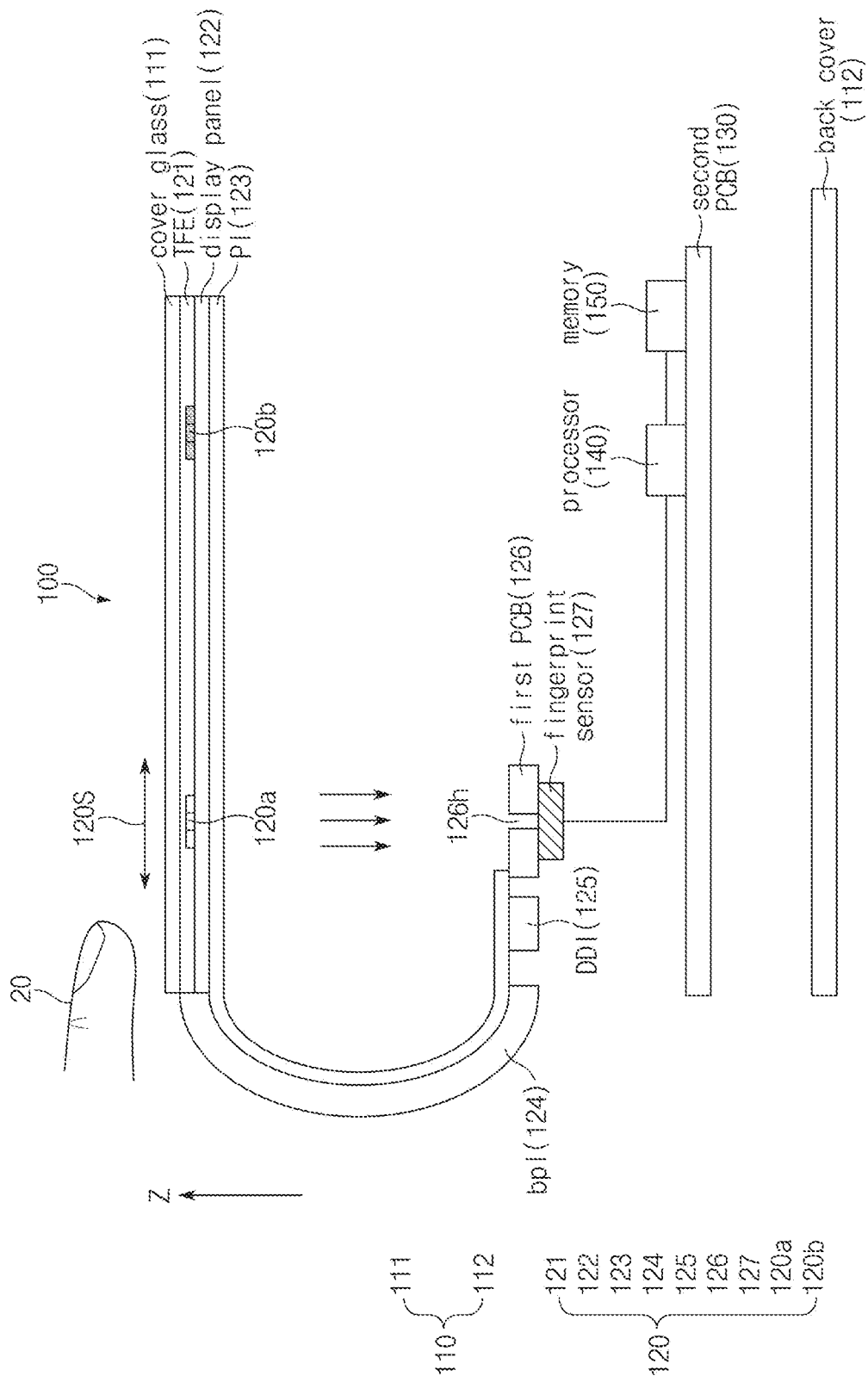
FIG. 2 illustrates a cross-sectional view of an electronic device, according to an embodiment.

FIG. 2 illustrates the cross-sectional view of the electronic device 100 according to an embodiment. FIG. 2 illustrates the cross-sectional view taken along line A-A' of the electronic device 100 illustrated in FIG. 1.

Referring to FIG. 2, the electronic device 100 may include the housing 110, the display 120, a second printed circuit board 130, a processor 140, and a memory 150.

The housing 110 may include a cover glass 111 and a back cover 112. The cover glass 111 may transmit light generated from the display 120. In addition, as the user touches the cover glass 111 with a part of the physical body (e.g., the finger 20) of the user, a touch operation (including the contact with an electronic pen) is performed on the cover glass 111. The cover glass 111 may be formed of, for example, a tampered glass, reinforced plastic, or a flexible polymeric material. According to an embodiment, the cover glass 111 may be referred to as a "glass window"

The back cover 112 may be coupled to the rear surface of the electronic device 100. The back cover 112 may be formed of tempered glass, plastic, and/or metal. According to an embodiment, the back cover 112 may be implemented integrally with the cover glass 111 or may be implemented detachably from a user.

The display 120 may include a thin film encapsulation film 121, a display panel 122, first-group pixels 120a, second-group pixels 120b, a polyimide film 123, a bending protect layer (BPL) 124, a display driver integrated chip (DDI) 125, a first printed circuit board 126, and a fingerprint sensor 127. The display 120 may not include some of components illustrated in FIG. 2, and may additionally include components in addition to the components illustrated in FIG. 2.

The thin film encapsulation film 121 may be disposed in a −z direction of the cover glass 111. The thin film encapsulation film 121 may protect pixels disposed on the display panel 122.

In the display panel 122, a plurality of wires, the first-group pixels 120a, and the second-group pixels 120b may be disposed. For example, a plurality of gate lines and a plurality of data lines may be arranged in the display panel 122, and may cross each other. The pixels 120a and 120b may emit light based on signals supplied from the gate lines and the data lines The first-group pixels 120a may refer to pixels disposed at an area, which corresponds to the fingerprint sensor 127, of the display panel 122. The first-group pixels 120a may emit light when the finger 20 of the user makes contact with the fingerprint sensing area 120s. The second-group pixels 120b may refer to pixels disposed on a remaining area of the display panel 122 other than the area corresponding to the fingerprint sensor 127.

The PI film 123 may be disposed in −z direction of the display panel 122. The PI film 123 may include a wiring to supply power and/or a signal to the display panel 122. According to an embodiment, the PI film 123 may include a bendable material and extend to the first printed circuit board 126 from one end of the display 120.

The BPL 124 is attached to a bent area of the PI film 123 to prevent the PI film 123 from being damaged (or broken).

The DDI 125 may be disposed at a partial area of the PI film 123. The DDI 125 may control the pixels 120a and 120b disposed on the display panel 122 through the PI film 123. For example, the DDI 125 may emit light of the first-group pixels 120a.

The first printed circuit board 126 may be electrically connected with a partial area of the PI film 123. For example, the first printed circuit board 126 may be electrically connected with a conductive pattern (or wiring) formed on the PI film 123.

The fingerprint sensor 127 may obtain fingerprint information through a hole 126h formed in the first printed circuit board 126. For example, when the finger 20 of the user makes contact with the fingerprint sensing area 120s, the first-group pixels 120a may emit light. Light output from the first-group pixels 120a may be reflected by the finger 20 of the user and input to the fingerprint sensor 127 through the hole 126h. The fingerprint sensor 127 may obtain fingerprint information of the user based on the input light.

The second printed circuit board 130 may be interposed between the display 120 and the back cover 112. Various components included in the electronic device 100 may be disposed on the second printed circuit board 130. For example, the processor 140 and the memory 150 may be disposed on the second printed circuit board 130.

The processor 140 may be electrically connected with the display 120. The processor 140 may adjust the brightness of the first-group pixels 120a. According to an embodiment, the processor 140 may increase the brightness of the first-group pixels 120a in proportion to a time in which the finger 20 of the user makes contact with the fingerprint sensing area 120s. For example, when the finger 20 of the user makes contact with the fingerprint sensing area 120s, the processor 140 may control the first-group pixels 120a to emit light with 300 Lux. If the fingerprint information is not obtained even if the first-group pixels 120a emit the light with 300 Lux, the processor 140 may gradually increase the brightness of the first-group pixels 120a. The brightness of the first-group pixels 120a may be gradually increased until the fingerprint information is obtained.

According to another embodiment, the processor 140 may increase the brightness of the first-group pixels 120a in proportion to a count that the finger 20 of the user makes contact with the fingerprint sensing area 120s. For example, when the finger 20 of the user makes contact with the first-group pixels 120a, the processor 140 may control the first-group pixels 120a to emit light with 300 Lux. If the fingerprint information is not obtained even if the first-group pixels 120a emit the light with 300 Lux, the user detaches the finger 20 from the fingerprint sensing area 120s and makes contact with the fingerprint sensing area 120s with the finger 20 again, and the processor 140 may control the first-group pixels 120a to emit light with 400 Lux. Whenever the user detaches the finger 20 from the fingerprint sensing area 120s and makes contact with the fingerprint sensing area 120s again, the brightness of the first-group pixels 120a may be gradually increased.

According to another embodiment, the electronic device 100 may calculate a failure count that the fingerprint information fails to be obtained even if the finger 20 of the user makes contact with the fingerprint sensing area 120s. The electronic device 100 may set the initial brightness of the first-group pixels 120a based on the failure count. For example, if the fingerprint information of a first user fails to be obtained one time, the electronic device 100 may set the brightness of the first-group pixels 120a to 300 Lux. For example, if the fingerprint information of the second user fails to be obtained two times, the electronic device 100 may set the brightness of the first-group pixels 120a to 400 Lux. As the failure count is increased, the brightness of the first-group pixels 120a may be gradually increased.

According to a comparative example, the electronic device 10 may emit light of the first-group pixels 120a with the same brightness (or the maximum brightness) whenever the finger 20 of the user makes contact with the fingerprint sensing area 13 regardless of the time or the count that the finger 20 of the user makes contact with the fingerprint sensing area 13 or the failure count. Accordingly, a burn-in phenomenon may occur in the first-group pixels and an area adjacent to the first-group pixels. However, according to an embodiment of the disclosure, the electronic device 100 may adjust the brightness of the first-group pixels 120a based on the time or the count that the finger 20 of the user makes contact with the fingerprint sensing area 120s or the failure count. Accordingly, a burn-in phenomenon may be prevented from occurring in the first-group pixels 120a and an area adjacent to the first-group pixels 120a.

The memory 150 may be electrically connected with the processor 140. The memory 150 may store the fingerprint information obtained by the processor 140.

In the disclosure, the description made with reference to FIGS. 1 and 2 will be identically applied to the components having the same reference numerals as those of the components of the electronic device 100 and the display 120 illustrated in FIGS. 1 and 2.

Figure 3:
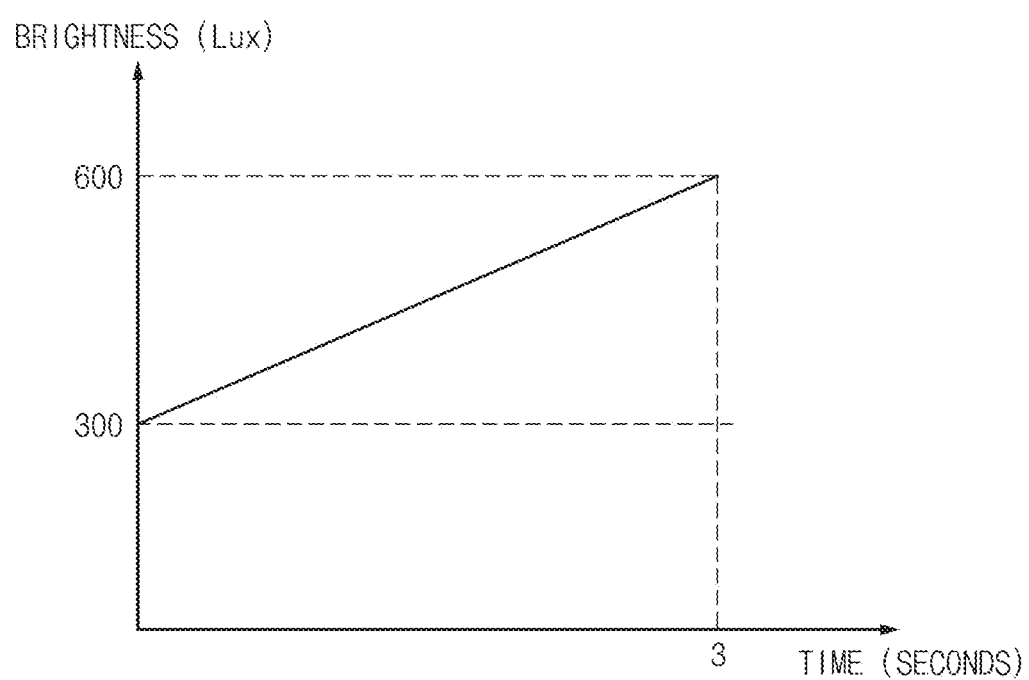
FIG. 3 illustrates the brightness of a fingerprint sensing area according to an embodiment.

FIG. 3 illustrates the brightness of the fingerprint sensing area according to an embodiment.

Referring to FIG. 3, the electronic device 100 may gradually increase the brightness of the first-group pixels 120a in proportion to a time in which the finger 20 of the user makes contact with the fingerprint sensing area 120s. For example, when the finger 20 of the user makes contact with the fingerprint sensing area 120s, the electronic device 100 may control the first-group pixels 120a to emit light with 300 Lux. If the fingerprint information is not obtained, the electronic device 100 may gradually increase the brightness of the first-group pixels 120a until the fingerprint information of the user is obtained. To the contrary, if the fingerprint information is obtained, the electronic device 100 may execute a specified function. For example, if the fingerprint information of the user is obtained, the electronic device 100 may unlock the locked screen or may perform a financial payment function.

According to a comparative example, the electronic device 10 may emit light of the first-group pixels 120a with the maximum brightness (e.g., 600 Lux) when the finger 20 of the user makes contact with the fingerprint sensing area 13 regardless of the time that the finger 20 of the user makes contact with the fingerprint sensing area 13. Accordingly, a burn-in phenomenon may occur in the first-group pixels and an area adjacent to the first-group pixels. However, according to an embodiment of the disclosure, the electronic device 100 may gradually increase the brightness of the first-group pixels 120a in proportion to a time in which the finger 20 of the user makes contact with the fingerprint sensing area 120s. Accordingly, a burn-in phenomenon may be prevented from occurring in the first-group pixels 120a and an area adjacent to the first-group pixels 120a.

Figure 4:
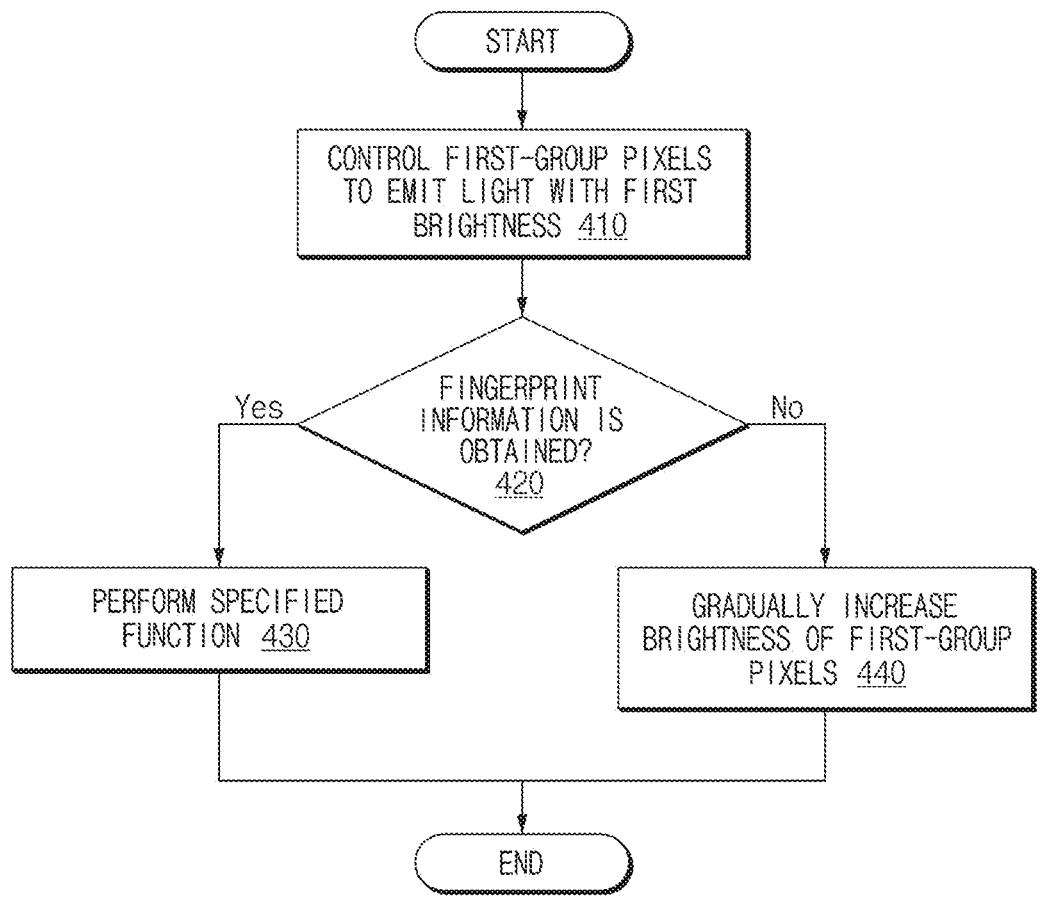
FIG. 4 illustrates a flowchart of the operation of an electronic device, according to an embodiment.

FIG. 4 illustrates a flowchart illustrating the operation of the electronic device, according to an embodiment. FIG. 4 is a flowchart illustrating the operation of the electronic device 100 illustrated in FIGS. 1 and 2.

Referring to FIG. 4, in operation 410, the electronic device 100 may control the first-group pixels 120a to emit light with a first brightness. For example, when the finger 20 of the user makes contact with the fingerprint sensing area 120s, the electronic device 100 may control the first-group pixels 120a to emit light with 300 Lux. In this case, the second-group pixels 120b may be turned off or may emit light with a brightness lower than the brightness of the first-group pixels 120a.

In operation 420, the electronic device 100 may determine whether the fingerprint information is obtained. For example, light output from the first-group pixels 120a may be reflected by the finger 20 of the user and returned. The electronic device 100 may obtain fingerprint information of a user based on the reflected light. To the contrary, when the brightness of the light output from the first-group pixels 120a is low (dark), the fingerprint information may not be obtained.

In operation 430, the electronic device 100 may perform a specified function based on the obtained fingerprint information. For example, when the fingerprint information of the user is obtained, the electronic device 100 may unlock the locked screen or may perform a financial payment function.

In operation 440, the electronic device 100 may gradually increase the brightness of the first-group pixels 120a until the fingerprint information of the user is obtained. For example, the electronic device 100 may gradually increase the brightness of the first-group pixels 120a in proportion to a time in which the finger 20 of the user makes contact with the fingerprint sensing area 120s until the fingerprint information of the user is obtained.

Figure 5:
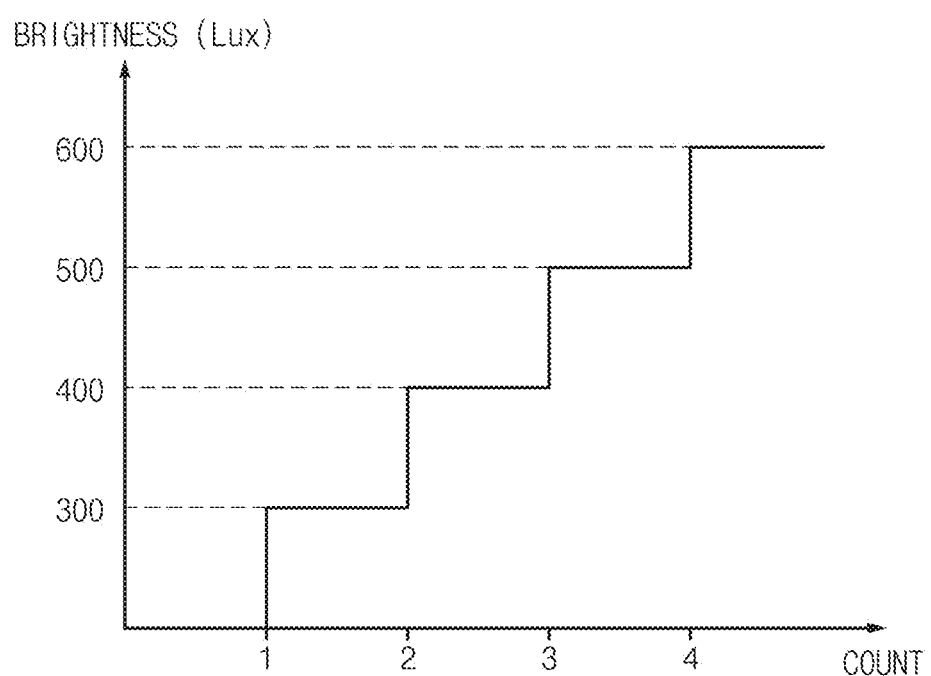
FIG. 5 illustrates the brightness of a fingerprint sensing area according to another embodiment.

FIG. 5 illustrates the brightness of the fingerprint sensing area according to another embodiment.

Referring to FIG. 5, the electronic device 100 may gradually increase the brightness of the first-group pixels 120a in proportion to a count in which the finger 20 of the user makes contact with the fingerprint sensing area 120s. For example, when the finger 20 of the user makes contact with the fingerprint sensing area 120s, the processor 140 may control the first-group pixels 120a to emit light with 300 Lux. If the fingerprint information is not obtained even if the first-group pixels 120a emits the light with 300 Lux, the user detaches the finger 20 and makes contact with the fingerprint sensing area 120s with the finger 20 again, and the processor 140 may control the fingerprint sensing area 120s to emit light with 400 Lux. The operations will be repeated until the fingerprint information of the user is obtained.

According to a comparative example, the electronic device 10 may emit light of the first-group pixels 120a with the same brightness (or the maximum brightness) whenever the finger 20 of the user makes contact with the fingerprint sensing area 13 regardless of the count that the finger 20 of the user makes contact with the fingerprint sensing area 13. Accordingly, a burn-in phenomenon may occur in the first-group pixels and an area adjacent to the first-group pixels.

However, according to an embodiment of the disclosure, the electronic device 100 may adjust the brightness of the first-group pixels 120*a* based on the count that the finger 20 of the user makes contact with the fingerprint sensing area 120*s*. Accordingly, a burn-in phenomenon may be prevented from occurring in the first-group pixels 120*a* and an area adjacent to the first-group pixels 120*a*.

Figure 6:
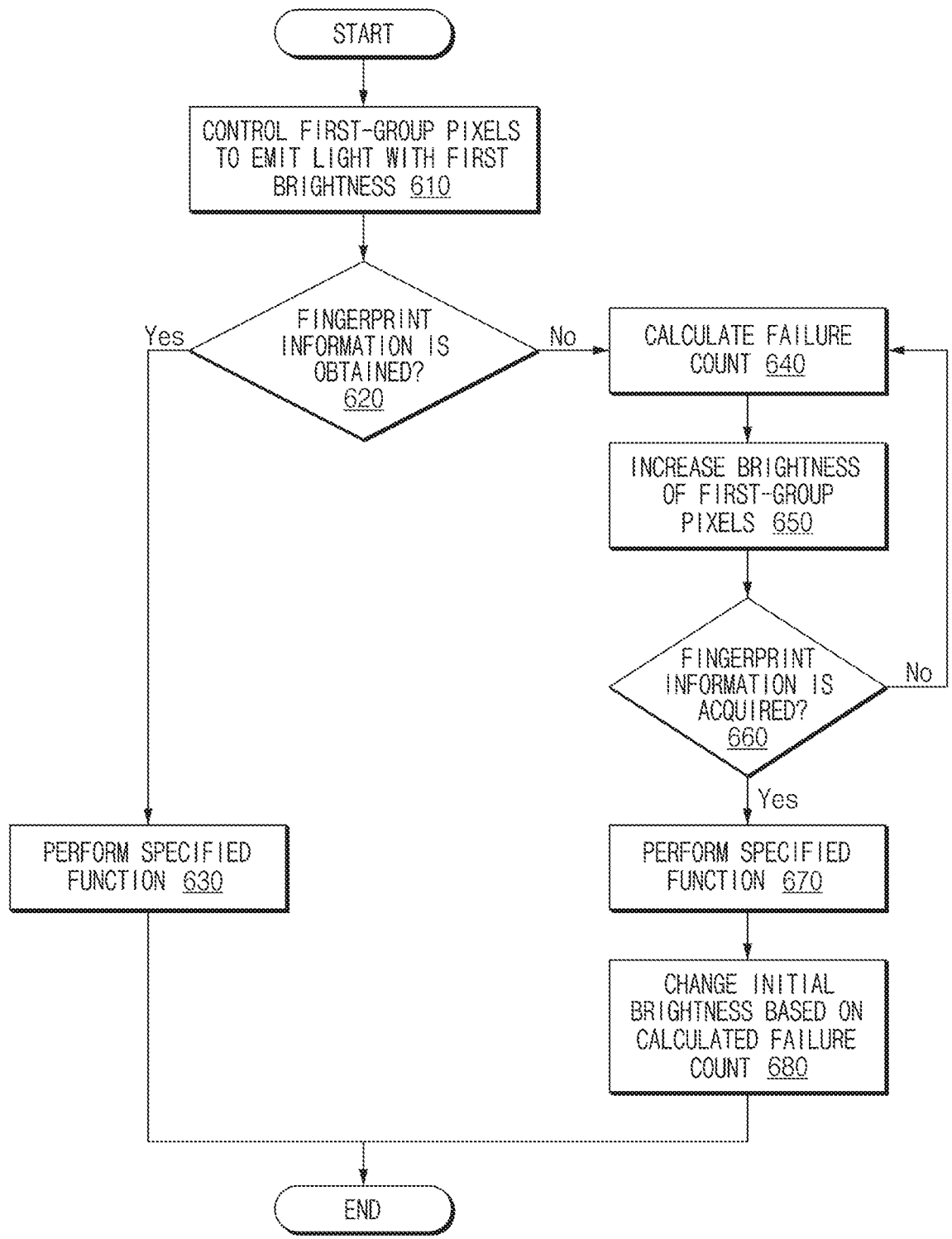
FIG. 6 illustrates a flowchart of the operation of an electronic device, according to another embodiment.

FIG. 6 illustrates a flowchart of the operation of the electronic device, according to another embodiment.

Referring to FIG. 6, in operation 610, the electronic device 100 may control the first-group pixels 120*a* to emit light with a first brightness. For example, when the finger 20 of the user makes contact with the fingerprint sensing area 120*s*, the electronic device 100 may control the first-group pixels 120*a* to emit light with 300 Lux.

In operation 620, the electronic device 100 may determine whether the fingerprint information is obtained. For example, light output from the first-group pixels 120*a* may be reflected by the finger 20 of the user and returned. The electronic device 100 may obtain fingerprint information of the user based on the reflected light. To the contrary, when the brightness of the light output from the first-group pixels 120*a* is low (dark), the fingerprint information may not be obtained.

In operation 630, the electronic device 100 may perform a specified function based on the obtained fingerprint information. For example, when the fingerprint information of the user is obtained, the electronic device 100 may unlock the locked screen or may perform a financial payment function.

If the fingerprint information is not obtained, the electronic device 100 may calculate the failure count in operation 640. The failure count may refer to a count that the fingerprint information fails to be obtained even if the finger 20 of the user makes contact with the fingerprint sensing area 120*s*.

In operation 650, the electronic device 100 may increase the brightness of the first-group pixels 120*a*. For example, when the failure count is '1', the brightness of the first-group pixels 120*a* may be increased to 400 Lux. When the failure count is '2', the brightness of the first-group pixels 120*a* may be increased to 500 Lux. The brightness of the first-group pixels 120*a* may be increased in proportion of the failure count.

In operation 660, the electronic device 100 may determine whether the fingerprint information is obtained. If the fingerprint information fails to be obtained, the electronic device 100 may calculate the failure count again. If the fingerprint information is obtained, the electronic device 100 may perform a specified function in operation 670.

In operation 680, the electronic device 100 may set the initial brightness of the first-group pixels 120*a* based on the calculated failure count. For example, if the failure count is '1', the brightness of the first-group pixels 120*a* may be set to 400 Lux. In this case, when the user attempts the fingerprint authentication again, the electronic device 100 may control the first-group pixels 120*a* to emit light with 400 Lux. According to another embodiment, if the failure count is '2', the electronic device 100 may set the brightness of the first-group pixels 120*a* to 500 Lux. In this case, when the user attempts the fingerprint authentication again, the electronic device 100 may control the first-group pixels 120*a* to emit light with 500 Lux.

According to a comparative example, the electronic device 10 may emit light of the first-group pixels with the maximum brightness (e.g., 600 Lux) whenever the finger 20 of the user makes contact with the fingerprint sensing area 13 regardless of the failure count. Accordingly, a burn-in phenomenon may occur in the first-group pixels and an area adjacent to the first-group pixels. However, according to an embodiment of the disclosure, the electronic device 100 may adjust the brightness of the first-group pixels 120*a* based on the failure count. Accordingly, a burn-in phenomenon may be prevented from occurring in the first-group pixels 120*a* and an area adjacent to the first-group pixels 120*a*.

Figure 7:
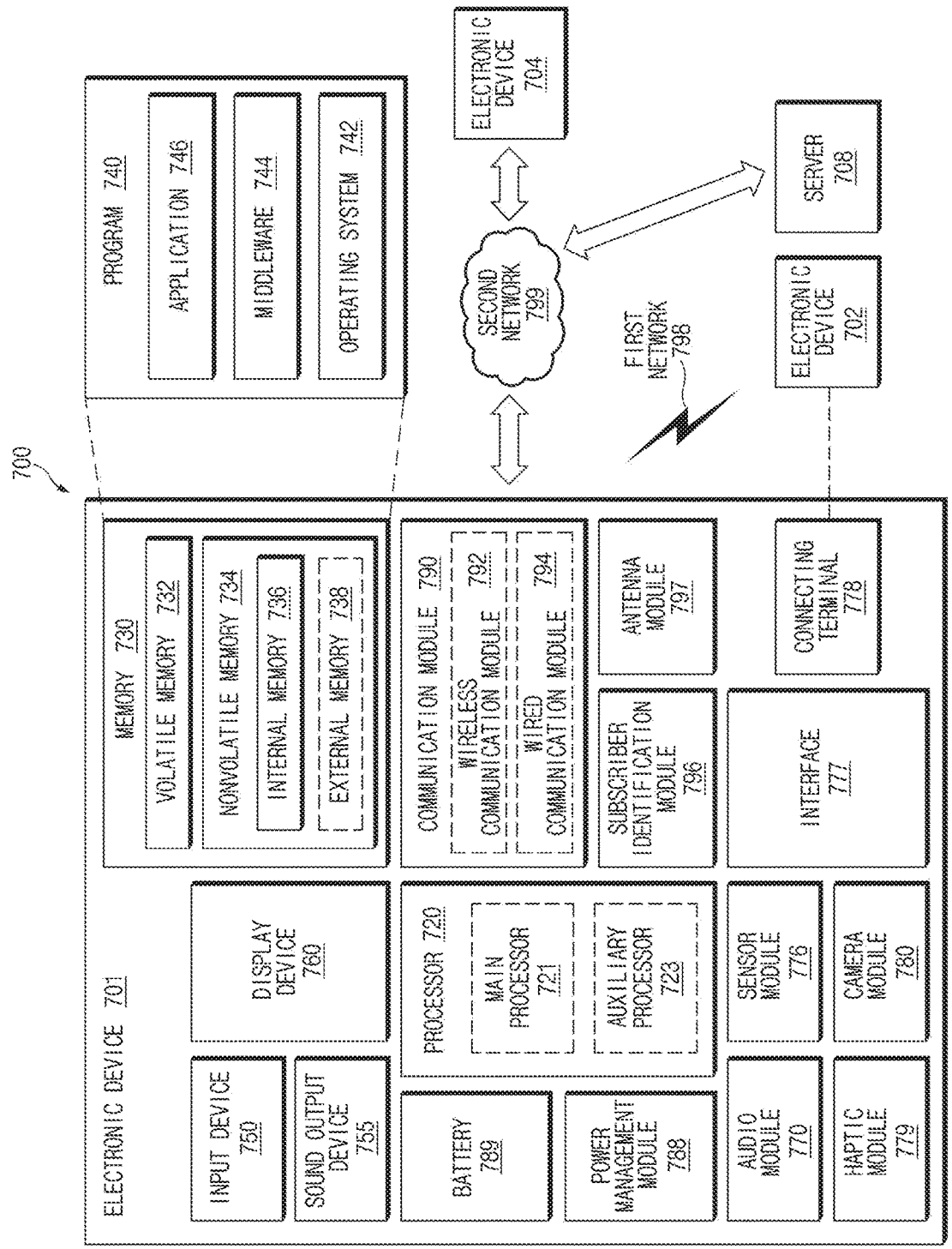
FIG. 7 illustrates a block diagram of an electronic device in a network environment, according to various embodiments.

FIG. 7 illustrates a block diagram of an electronic device 701 in a network environment 700 according to various embodiments. Referring to FIG. 7, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In some embodiments, at least one (e.g., the display device 760 or the camera module 780) of the components may be omitted from the electronic device 701, or one or more other components may be added in the electronic device 701. In some embodiments, some of the components may be implemented as single integrated circuitry. For example, the sensor module 776 (e.g., a fingerprint sensor, an iris sensor, or an illuminance sensor) may be implemented as embedded in the display device 760 (e.g., a display).

The processor 720 may execute, for example, software (e.g., a program 740) to control at least one other component (e.g., a hardware or software component) of the electronic device 701 coupled with the processor 720, and may perform various data processing or computation. According to one embodiment, as at least part of the data processing or computation, the processor 720 may load a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, a keyboard, or a digital pen (e.g., a stylus pen).

The sound output device 755 may output sound signals to the outside of the electronic device 701. The sound output device 755 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to an embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to an embodiment, the audio module 770 may obtain the sound via the input device 750, or output the sound via the sound output device 755 or a headphone of an external electronic device (e.g., an electronic device 702) directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wired) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector).

The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to one embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or infrared data association (IrDA)) or the second network 799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to an embodiment, the antenna module 797 may include an antenna including a radiating element composed of a conductive material or a conductive pattern formed in or on a substrate (e.g., PCB). According to an embodiment, the antenna module 797 may include a plurality of antennas. In such a case, at least one antenna appropriate for a communication scheme used in the communication network, such as the first network 798 or the second network 799, may be selected, for example, by the communication module 790 (e.g., the wireless communication module 792) from the plurality of antennas. The signal or the power may then be transmitted or received between the communication module 790 and the external electronic device via the selected at least one antenna. According to an embodiment, another component (e.g., a radio frequency integrated circuit (RFIC)) other than the radiating element may be additionally formed as part of the antenna module 797.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

Figure 8:
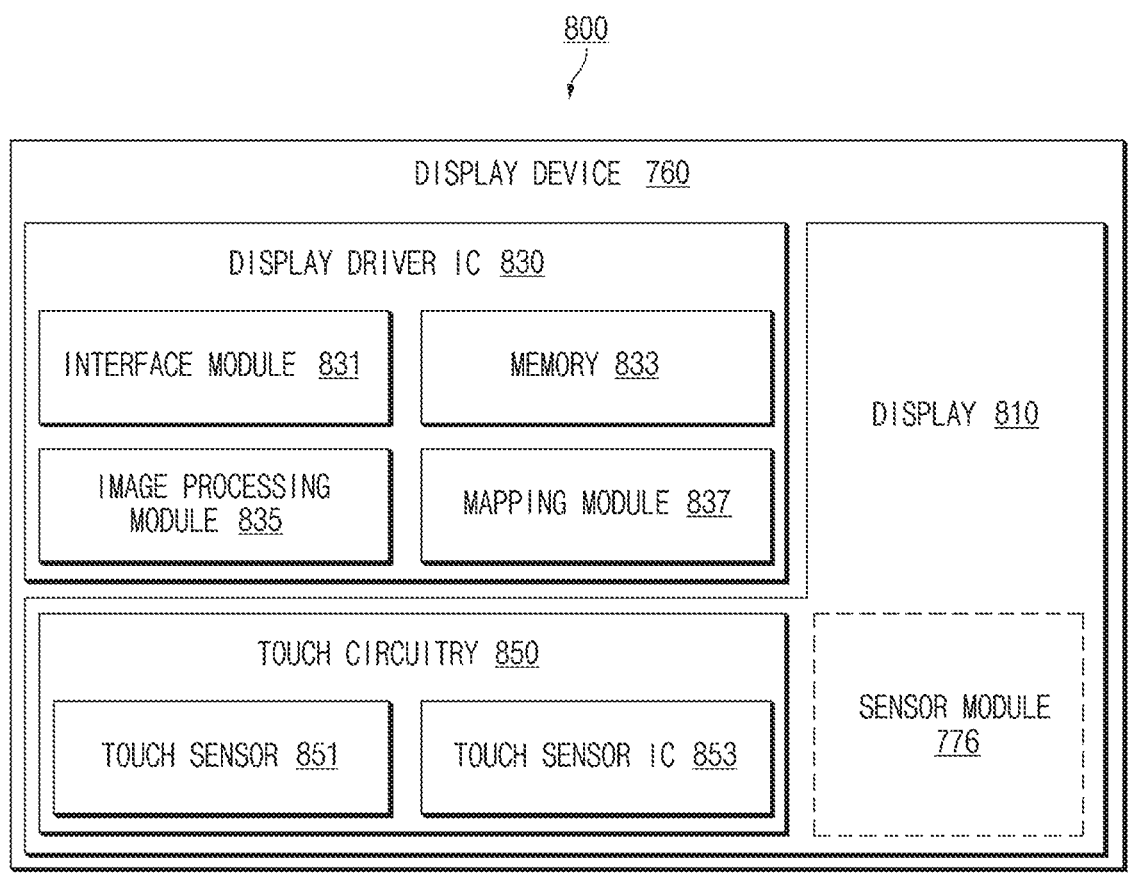
FIG. 8 illustrates a block diagram of the display device according to various embodiments.

FIG. 8 illustrates a block diagram 800 of the display device 760 according to various embodiments. Referring to FIG. 8, the display device 760 may include a display 810 and a display driver integrated circuit (DDI) 830 to control the display 810. The DDI 830 may include an interface module 831, memory 833 (e.g., buffer memory), an image processing module 835, or a mapping module 837. The DDI 830 may receive image information that contains image data or an image control signal corresponding to a command to control the image data from another component of the electronic device 701 via the interface module 831. For example, according to an embodiment, the image information may be received from the processor 720 (e.g., the main processor 721 (e.g., an application processor)) or the auxiliary processor 723 (e.g., a graphics processing unit) operated independently from the function of the main processor 721. The DDI 830 may communicate, for example, with touch circuitry 750 or the sensor module 776 via the interface module 831. The DDI 830 may also store at least part of the received image information in the memory 833, for example, on a frame by frame basis.

The image processing module 835 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 810.

The mapping module 837 may generate a voltage value or a current value corresponding to the image data pre-processed or post-processed by the image processing module 835. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 810 may be driven, for example, based at least in part on the voltage value or the current value such that visual information (e.g., a text, an image, or an icon) corresponding to the image data may be displayed via the display 810.

According to an embodiment, the display device 760 may further include the touch circuitry 850. The touch circuitry 850 may include a touch sensor 851 and a touch sensor IC 853 to control the touch sensor 851. The touch sensor IC 853 may control the touch sensor 851 to sense a touch input or a hovering input with respect to a certain position on the display 810. To achieve this, for example, the touch sensor 851 may detect (e.g., measure) a change in a signal (e.g., a voltage, a quantity of light, a resistance, or a quantity of one or more electric charges) corresponding to the certain position on the display 810. The touch circuitry 850 may provide input information (e.g., a position, an area, a pressure, or a time) indicative of the touch input or the hovering input detected via the touch sensor 851 to the processor 720. According to an embodiment, at least part (e.g., the touch sensor IC 853) of the touch circuitry 850 may be formed as part of the display 810 or the DDI 830, or as part of another component (e.g., the auxiliary processor 723) disposed outside the display device 760.

According to an embodiment, the display device 760 may further include at least one sensor (e.g., a fingerprint sensor, an iris sensor, a pressure sensor, or an illuminance sensor) of the sensor module 776 or a control circuit for the at least one sensor. In such a case, the at least one sensor or the control circuit for the at least one sensor may be embedded in one portion of a component (e.g., the display 810, the DDI 830, or the touch circuitry 750)) of the display device 760. For example, when the sensor module 776 embedded in the display device 760 includes a biometric sensor (e.g., a fingerprint sensor), the biometric sensor may obtain biometric information (e.g., a fingerprint image) corresponding to a touch input received via a portion of the display 810. As another example, when the sensor module 776 embedded in the display device 760 includes a pressure sensor, the pressure sensor may obtain pressure information corresponding to a touch input received via a partial or whole area of the display 810. According to an embodiment, the touch sensor 851 or the sensor module 776 may be disposed between pixels in a pixel layer of the display 810, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, according to embodiments in the disclosure, the display burn-in may be prevented.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a housing including a cover glass and a back cover facing the cover glass;
   a display panel disposed inside the housing and including a plurality of pixels disposed in the display panel;
   a first printed circuit board interposed between the display panel and the back cover;
   a second printed circuit board interposed between the first printed circuit board and the back cover;
   a fingerprint sensor disposed on the first printed circuit board and configured to obtain fingerprint information of a user based on light reflected from an external object making contact with the display panel; and
   a processor disposed on the second printed circuit board and configured to adjust a brightness of first-group pixels disposed at a fingerprint sensing area corresponding to the fingerprint sensor,
   wherein the processor is configured to:
   attempt fingerprint authentication by emitting light of the first-group pixels with a first brightness when a touch is detected at the fingerprint sensing area of the display panel; and
   increase the first brightness of the first-group pixels to a second brightness brighter than the first brightness each time the touch is detached from the fingerprint sensing area and then a re-touch is detected at the fingerprint sensing area, such that the second brightness gradually increases with each re-touch, wherein while the touch is maintained, the brightness of the first-group pixels increases to be proportional to an elapsed time in which the touch is detected at the fingerprint sensing area.

2. The electronic device of claim 1, wherein the processor is configured to:

decrease the brightness of the first-group pixels when the touch is detached from the fingerprint sensing area.

3. The electronic device of claim 1, wherein the processor is configured to:

unlock a locked screen or perform a financial payment when the fingerprint authentication succeeds.

4. The electronic device of claim 1, further comprising:

second-group pixels disposed on a remaining area of the display panel other than the fingerprint sensing area corresponding to the fingerprint sensor.

5. The electronic device of claim 4, wherein the processor is configured to:

control the first-group pixels to emit light brighter than light emitted from the second-group pixels when the touch is detected at the fingerprint sensing area.

6. The electronic device of claim 1, wherein the fingerprint sensor receives the reflected light through a hole formed in the first printed circuit board.

7. An electronic device comprising:

a housing including a cover glass and a back cover facing the cover glass;

a display panel disposed inside the housing and including a plurality of pixels disposed in the display panel;

a first printed circuit board interposed between the display panel and the back cover;

a second printed circuit board interposed between the first printed circuit board and the back cover;

a fingerprint sensor disposed on the first printed circuit board and configured to obtain fingerprint information of a user based on light reflected from an external object making contact with the display panel; and a processor disposed on the second printed circuit board and configured to adjust a brightness of first-group pixels disposed at a fingerprint sensing area corresponding to the fingerprint sensor, wherein the processor is configured to:

calculate a failure count that corresponds to a number of failed fingerprint authentication attempts even though a touch is detected at the fingerprint sensing area of the display panel;

set an initial brightness of the first-group pixels based on the failure count;

gradually increase the brightness of the first-group pixels as the failure count is increased; and emit light of the first-group pixels with the increased brightness when the touch is detected at the fingerprint sensing area, wherein when the touch is detected, the brightness of the first-group pixels increases to be proportional to the failure count.

8. The electronic device of claim 7, further comprising:

second-group pixels disposed on a remaining area of the display panel other than the fingerprint sensing area corresponding to the fingerprint sensor.

9. The electronic device of claim 8, wherein the processor is configured to:

control the first-group pixels to emit light brighter than light emitted from the second-group pixels when the touch is detected at the fingerprint sensing area.

10. The electronic device of claim 7, wherein the fingerprint sensor receives the reflected light through a hole formed in the first printed circuit board.

* * * * *